(12) United States Patent
Barnett

(10) Patent No.: US 7,634,722 B2
(45) Date of Patent: Dec. 15, 2009

(54) REVERSIBLE LOGIC FOR WIDGET AND MARKUP LANGUAGE GENERATION

(75) Inventor: James Barnett, Auburndale, MA (US)

(73) Assignee: Aspect Software, Inc., Lombard, IL (US)

( * ) Notice: Subject to any disclaimer, the term of this patent is extended or adjusted under 35 U.S.C. 154(b) by 413 days.

(21) Appl. No.: 11/075,793

(22) Filed: Mar. 8, 2005

(65) Prior Publication Data

US 2006/0206804 A1    Sep. 14, 2006

(51) Int. Cl.
*G06F 17/21* (2006.01)
(52) U.S. Cl. .................. 715/239; 715/234; 715/235; 715/762; 715/763; 717/109; 717/112; 717/113
(58) Field of Classification Search ................ 715/234, 715/235, 239, 762, 763; 717/109, 112, 113
See application file for complete search history.

(56) References Cited

U.S. PATENT DOCUMENTS

| | | | |
|---|---|---|---|
| 5,353,401 A * | 10/1994 | Iizawa et al. ............... 715/763 |
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Macleod Beck et al. | |
| 6,175,563 B1 | 1/2001 | Miloslavsky | |
| 6,175,564 B1 | 1/2001 | Miloslavsky | |
| 6,185,292 B1 | 2/2001 | Miloslavsky | |
| 6,342,907 B1 | 1/2002 | Petty et al. | |
| 6,345,305 B1 | 2/2002 | Beck et al. | |

(Continued)

FOREIGN PATENT DOCUMENTS

WO    WO-0223444 A1    3/2002

(Continued)

OTHER PUBLICATIONS

J. Tarin Towers et al., "Macromedia Dreamweaver MX Advanced for Windows and Macintosh: Visual Quickpro Guide," Dec. 13, 2002, Peachpit Press.*

(Continued)

*Primary Examiner*—Joshua D Campbell
(74) *Attorney, Agent, or Firm*—Husch Blackwell Sanders Welsh & Katz

(57) ABSTRACT

Method, apparatus and systems provide reversible logic for widget and markup language generation. In some embodiments, a method includes receiving one or more widgets. The method also includes generating first markup language code having semantics that are independent of a description of the one or more widgets. The method includes receiving second markup language code. The method also includes generating the one or more widgets based on the second markup language code.

7 Claims, 15 Drawing Sheets

U.S. PATENT DOCUMENTS

| | | | |
|---|---|---|---|
| 6,373,836 B1 | 4/2002 | Deryugin et al. | |
| 6,374,207 B1 | 4/2002 | Li et al. | |
| 6,389,007 B1 | 5/2002 | Shenkman et al. | |
| 6,393,015 B1 | 5/2002 | Shtivelman | |
| 6,732,156 B2 | 5/2004 | Miloslavsky | |
| 6,760,043 B2 | 7/2004 | Markel | |
| 6,760,902 B1* | 7/2004 | Ott | 717/113 |
| 6,973,625 B1* | 12/2005 | Lupo et al. | 715/762 |
| 2001/0044801 A1 | 11/2001 | Senn et al. | |
| 2002/0069217 A1 | 6/2002 | Chen et al. | |
| 2002/0087986 A1 | 7/2002 | Markel | |
| 2002/0111964 A1 | 8/2002 | Chen et al. | |
| 2002/0143803 A1 | 10/2002 | Chen et al. | |
| 2002/0152244 A1 | 10/2002 | Dean et al. | |
| 2002/0188632 A1 | 12/2002 | Su | |
| 2003/0172193 A1 | 9/2003 | Olsen | |
| 2004/0001092 A1* | 1/2004 | Rothwein et al. | 345/763 |
| 2004/0015858 A1 | 1/2004 | Seto et al. | |
| 2004/0042593 A1 | 3/2004 | Gulrajani et al. | |
| 2004/0111670 A1 | 6/2004 | Sasakuma et al. | |
| 2004/0111673 A1* | 6/2004 | Bowman et al. | 715/513 |
| 2004/0148585 A1 | 7/2004 | Sengodan | |
| 2004/0177321 A1 | 9/2004 | Brown et al. | |
| 2004/0216042 A1* | 10/2004 | Consolatti et al. | 715/513 |
| 2006/0015846 A1* | 1/2006 | Fraleigh et al. | 717/109 |

FOREIGN PATENT DOCUMENTS

| | | |
|---|---|---|
| WO | WO-0241160 A1 | 5/2002 |
| WO | WO-02093886 A1 | 11/2002 |
| WO | WO-2004010678 A1 | 1/2004 |

OTHER PUBLICATIONS

Evans, Gary K., "Breadth and Depth: TogetherSoft's versatile Together ControlCenter 6.0 has outgrown the adolescent awkwardness of its earlier versions and is now the Swiss army knife of UML Case tools", *Software Development*, 10(9), (Sep. 2002),23(5) page(s).

Sloser, Stephanie E., "Mega Suite 5—From Mega International: Collaboration,Automation for B2B Platforms", *eAl Journal*. 3(4), (Apr. 2001),38.

* cited by examiner

```
400
       Template_Name PlayForm1
  401- Widget:   PlayForm
       Test:    True
       DetailRules:
       Body:
  406- <form>
       <block>
       <prompt count="1">
402 404- @InitialPrompt
       </prompt>
       </block>
       </form>
```

TemplateName: Field1
Widget Field
606 — Test: Grammar == 3
DetailRules: InputMode 602 — Path: <form>
Body:

```
<field name="@Widget.Name" type="@Grammar'?minlength='
@GrammarParameters.MininumNumberofDigits
';maxlength='@GrammarParameters.MaximumNumberofDigits">
<property name="confidencelevel" value="@Confidence Threshold"/>
<prompt count="1" bargein="@PromptInterruptible" timeout="@PrespeechTimeout">
@Prompts
</prompt>
<prompt count="2" bargein="@PromptInterruptible" timeout="@PrespeechTimeout">
@FailurePrompts
</prompt>
</field>
```

```
TemplateName:   Field2
Widget Field
702 ~ Test: Grammar == 5  && GrammarParameters.MinimumNumberOfDigits==0 &&
      GrammarParameters.MaximumNumberOfDigits==0
      DetailRules:  InputMode
      Path:  <field>
      Body:

<field name="@Widget.Name" type"number">

<property name="confidencelevel" value="@Confidence Threshold"/>
      <prompt count="1" bargein="@PromptInterruptible" timeout="@PrespeechTimeout">
704 ~  @Prompts
      </prompt>
      <prompt count="2" bargein="@PromptInterruptible" timeout="@PrespeechTimeout">
706 ~  @FailurePrompts
      </prompt>
      </field>
```

FIG. 7

TemplateName InputMode
Widget Form
Predicate: InputMode = 3
Path: <field>
802 Body:
   <property name="inputmodes" value="voice dtmf "/>

FIG. 8

```
<form>
<block>
<prompt count="1">
Hello, welcome to Bank America
</prompt>
</block>
</form>
```

FIG. 9

```
<form>
<block>
<prompt count="1">
Hello, welcome to Bank America
</prompt>
</block>
<field name="Account_Number" type="digits?minlength=8;maxlength=8">
<property name="confidencelevel" value="0.50"/>
<prompt count="1" bargein="true" timeout="5s">
Please enter your 8 digit account number
</prompt>
<prompt count="2" bargein="true" timeout="5s">
I'm sorry I did not hear you, please try again, enter your 8 digit account number
</prompt>
</field>
</form>
```

FIG. 10

```
<form>
<block>
<prompt count="1">
Hello, welcome to Bank America
</prompt>
</block>
<field name="Account_Number" type="digits?minlength=8;maxlength=8">
1102 — <property name="inputmodes" value="voice dtmf"/>
1104 — <property name="confidencelevel" value="0.50"/>
<prompt count="1" bargein="true" timeout="5s">
Please enter your 8 digit account number
</prompt>
<prompt count="2" bargein="true" timeout="5s">
I'm sorry I did not hear you, please try again, enter your 8 digit account number
</prompt>
</field>
</form>
```

FIG. 11

```
<form>
<block>
<prompt count="1">
Hello, welcome to Bank America
</prompt>
</block>  ~1202
<field name="Account_Number" type="number">
<property name="inputmodes" value="voice dtmf"/>
<property name="confidencelevel" value="0.50"/>
<prompt count="1" bargein="true" timeout="5s">
Please enter your 8 digit account number
</prompt>
<prompt count="2" bargein="true" timeout="5s">
I'm sorry I did not hear you, please try again, enter your 8 digit account number
</prompt>
</field>  ~1204
</form>
```

FIG. 12

```
<form>
<block>
<prompt count="1">
Hello, welcome to Bank America
</prompt>
</block>
<field name="Account_Number" type="number">
<property name="inputmodes" value="voice dtmf"/>
<prompt count="1" bargein="true" timeout="5s">
Please enter your 8 digit account number
</prompt>
<prompt count="2" bargein="true" timeout="5s">
I'm sorry I did not hear you, please try again, enter your 8 digit account number
</prompt>
</field>
</form>
```

REVERSIBLE LOGIC FOR WIDGET AND MARKUP LANGUAGE GENERATION

TECHNICAL FIELD

The application relates generally to data processing, and, more particularly, to processing of data to generate widgets and markup language.

BACKGROUND

The Extensible Markup Language (XML) includes rules that define tags that separate a document into different parts and identify those parts. Accordingly, XML enables users to define a new data model. Some less experienced developers of XML would like to avoid the syntactic complexity of the language. Therefore, some of these developers are using an easy-to-use drag-and-drop Graphical User Interface (GUI) to generate the XML. In particular, these GUI applications feature graphical widgets with properties that may be configured by the developer. Based on the widgets and the properties thereof, a translator may generate XML code, which may be executed by any standard interpreter. However, the function of these widgets is to generate XML at design time. In other words, such widgets are not part of the runtime executable.

Moreover, these GUI applications are limited and typically cannot generate all of the XML. Rather, such applications typically generate the most common constructs. Therefore, the work-around for these limitations is to subsequently edit the XML file generated by the GUI applications.

SUMMARY

Methods, apparatus and systems for reversible logic for widget and markup language generation are described. In some embodiments, a method includes receiving one or more widgets. The method also includes generating first markup language code having semantics that are independent of a description of the one or more widgets. The method includes receiving second markup language code. The method also includes generating the one or more widgets based on the second markup language code.

In some embodiments, a method includes receiving markup language code that is without a description of an attribute of a widget. The method also includes parsing the markup language code to locate a set of tags. The method includes matching, at least partially, the set of tags and data within the set of tags to a template. The method also includes generating the widget based on the template.

In some embodiments, a method includes receiving a number of widgets, wherein the number of widgets is associated with a number of reversible templates. The method includes generating descriptor language representative of the number of widgets using the number of reversible widgets. The descriptor language is independent of an attribute of the number of widgets. Additionally, the method includes updating the descriptor language based on edits. The method includes matching, at least partially, the descriptor language to at least part of the number of reversible templates or to a wildcard template. The method also includes generating the number of widgets based on the matched reversible templates or matched wildcard template.

In some embodiments, a system includes a machine-readable medium to store a number of widgets, a number of reversible templates and markup language. The system also includes markup language generation logic to generate markup language for the number of widgets based on the number of reversible templates associated with the number of widgets, wherein the markup language is independent of an attribute of the number of widgets. The system includes parser logic to receive an edited version of the markup language and to locate a set of tags within the edited version. Additionally, the system includes pattern match logic to match the set of tags and the data between the set of tags to a template and a number of subtemplates of the number of reversible templates. The system also includes a widget generator to generate one or more widgets based on the template and the number of subtemplates.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings:

FIG. 6 illustrates a template associated with the Field widget, according to some embodiments of the invention.

FIG. 7 illustrates another template for the Field widget, according to some embodiments of the invention.

FIG. 8 illustrates a subtemplate that is used in conjunction with one or more templates, according to some embodiments of the invention.

FIG. 9 illustrates markup language code based on the instantiation of a template for a widget, according to some embodiments of the invention.

FIG. 10 illustrates markup language code that includes the markup language code of FIG. 9 that is modified to include markup language code based on the instantiation of another template, according to some embodiments of the invention.

FIG. 11 illustrates markup language code that includes the markup language code of FIG. 10 that is modified to include markup language code based on the instantiation of a subtemplate, according to some embodiments of the invention.

FIG. 12 illustrates the markup language code of FIG. 11 that has been manually edited, according to some embodiments of the invention.

FIG. 15 illustrates the markup language code of FIG. 11 that has been manually edited, according to some embodiments of the invention.

DETAILED DESCRIPTION

Figure 1:
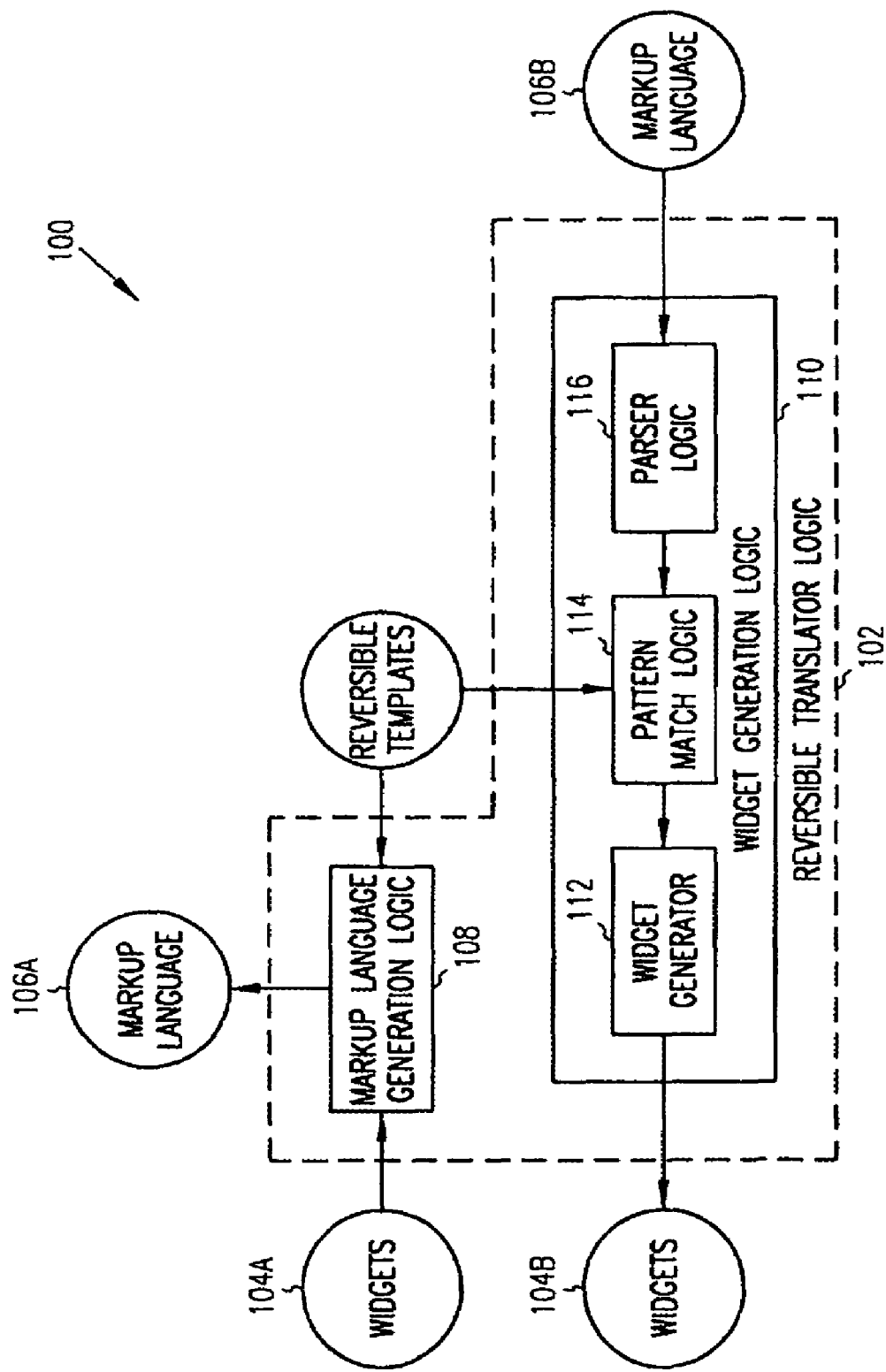
FIG. 1 is a simplified block diagram of a system having reversible logic for widget and markup language generation, according to some embodiments of the invention.

Methods, apparatus and systems for reversible logic for widget and markup language generation are described. In the following description, numerous specific details are set forth. However, it is understood that embodiments of the invention may be practiced without these specific details. In other instances, well-known circuits, structures and techniques have not been shown in detail in order not to obscure the understanding of this description. Additionally, in this description, the phrase "exemplary embodiment" means that the embodiment being referred to serves as an example or illustration.

As used herein, the term "markup language" may include any type of descriptor language or language that includes a set of commands that identify the structure of a document. In some embodiments, the markup language code is independent of descriptions of widgets. In particular, the semantics of the markup language code do not reference the widgets. For example, the semantics do not include any description of the attributes of the widgets (e.g., size, color, location, etc.). In other words, the markup language code is not a description of the widgets as graphical objects. Rather, the widgets are high-level descriptions of the markup language code. Examples of markup language may include different types of Standard General Markup Language (SGML), Hypertext Markup Language (HTML), etc. For example, the markup language may include different types of XML, such as VoiceXML, MusicXML, Synchronized Multimedia Integration Language (SMIL), Open Software Description (OSD), Chemical Markup Language, Mathematical Markup Language, etc.

As used herein, the term "widget" may include an on-screen representation of any type of control that a user may use to interface with an application or operating system. Examples of a widget may include pop-up windows, buttons, dialog boxes, icons, scroll bars, pull-down menus, toggle switches, tear-off menus, menu bars, resizable window edges, selection boxes, windows, progress indicators, text boxes, checkboxes, etc.

Some embodiments provide reversible logic to generate markup language from widgets and widgets from markup language using reversible templates. For widget generation, the markup language may have been generated based on a GUI application that enables users to create widgets that are subsequently used to generate the markup language. In some embodiments, prior to generating the widgets, a user may have manually edited the markup language. Alternatively or in addition, a user may have manually created the markup language using a standard text editor.

In some embodiments, a widget in the GUI application may have a list of properties that a developer may use to set values for prompts, timeouts, barge-in, etc. A widget may be associated with a reversible template, which provides a basic structure of the markup language to be generated. As part of the generation of the markup language, the correct template is selected based on the values of the properties. Subtemplates may be used to fill in the template. For example, in a Form widget, the basic template may provide the <form> . . . </form> tags, while the subtemplates fill in the attributes based on other properties (language, timeout values, etc.).

In some embodiments, to reverse the operation, the markup language is matched to the reversible templates. A particular reversible template may generate a corresponding GUI widget. The subtemplates are used to fill in the values of the properties of the widget.

System Architecture

FIG. 1 is a simplified block diagram of a system having reversible logic for widget and markup language generation, according to some embodiments of the invention. FIG. 1 includes a system 100 that includes a reversible translator logic 102, widgets 104A, widgets 104B, markup language 106A, markup language 106B and reversible templates 120. The reversible translator logic 102 may include a markup language generation logic 108 and a widget generation logic 110. The widget generation logic 110 may include a parser logic 116, a pattern match logic 114 and a widget generator 112.

The reversible translator logic 102, the markup language generation logic 108 and the widget generation logic 110, the parser logic 116, the pattern match logic 114 and the widget generator 112 may be software, hardware, firmware or a combination thereof. For example, such logic may be software instructions that are executed on a processor (not shown). The widgets 104A-104B, the markup language 106A-106B and the reversible templates 120 may be stored in volatile and/or non-volatile media (e.g., read only memory (ROM), random access memory (RAM), magnetic disk storage media, optical storage media, flash memory devices, etc.).

As shown, the markup language generation logic 108 generates markup language based on widgets, while the widget generation logic 110 generates widgets based on markup language. In some embodiments, the semantics of the markup language is independent of a description of how to generate the widgets. For example, for a box, the semantics of the markup language does not include a description of the location, size, shape, color, etc. of the box.

The markup language generation logic 108 is coupled to receive the reversible templates 120. The markup language generation logic 108 is also coupled to receive the widgets 104A and to output the markup language 106A, using the reversible templates 120. The parser logic 116 is coupled to receive the markup language 106B. The parser logic 116 may parse the markup language 106B to locate the sets of tags therein. The sets of tags may be any type of delimiters for the data within the markup language. For example, the tags may be markup elements, markup tags, etc.

The parser logic 116 may output the parsed data to the pattern match logic 114. The pattern match logic 114 may also receive the reversible templates 120. The pattern match logic 114 may match the parsed data to one or more of the reversible templates 120. The pattern match logic 114 may also select the reversible template that best matches a part of the parsed data (e.g., a given set of tags and the data there between). The pattern match logic 114 may output this reversible template to the widget generator 112. In some embodiments, the widget generator 112 may generate a new widget for a given template. In some embodiments, the widget generator 112 may update an existing widget based on the given template. A more detailed description of the operations of the reversible translator logic 102 is set forth below.

System Operations

Operations related to generating widgets based on markup language, according to some embodiments, are now described. In some embodiments, the operations may be performed by instructions residing on machine-readable media (e.g., software), by hardware, firmware, or a combination thereof. This description also includes a number of screenshots and markup language code to assist in the description of such operations. In particular, the number of screenshots and markup language code help to illustrate the operations and are interspersed within the description of the flow diagrams.

Figure 2:
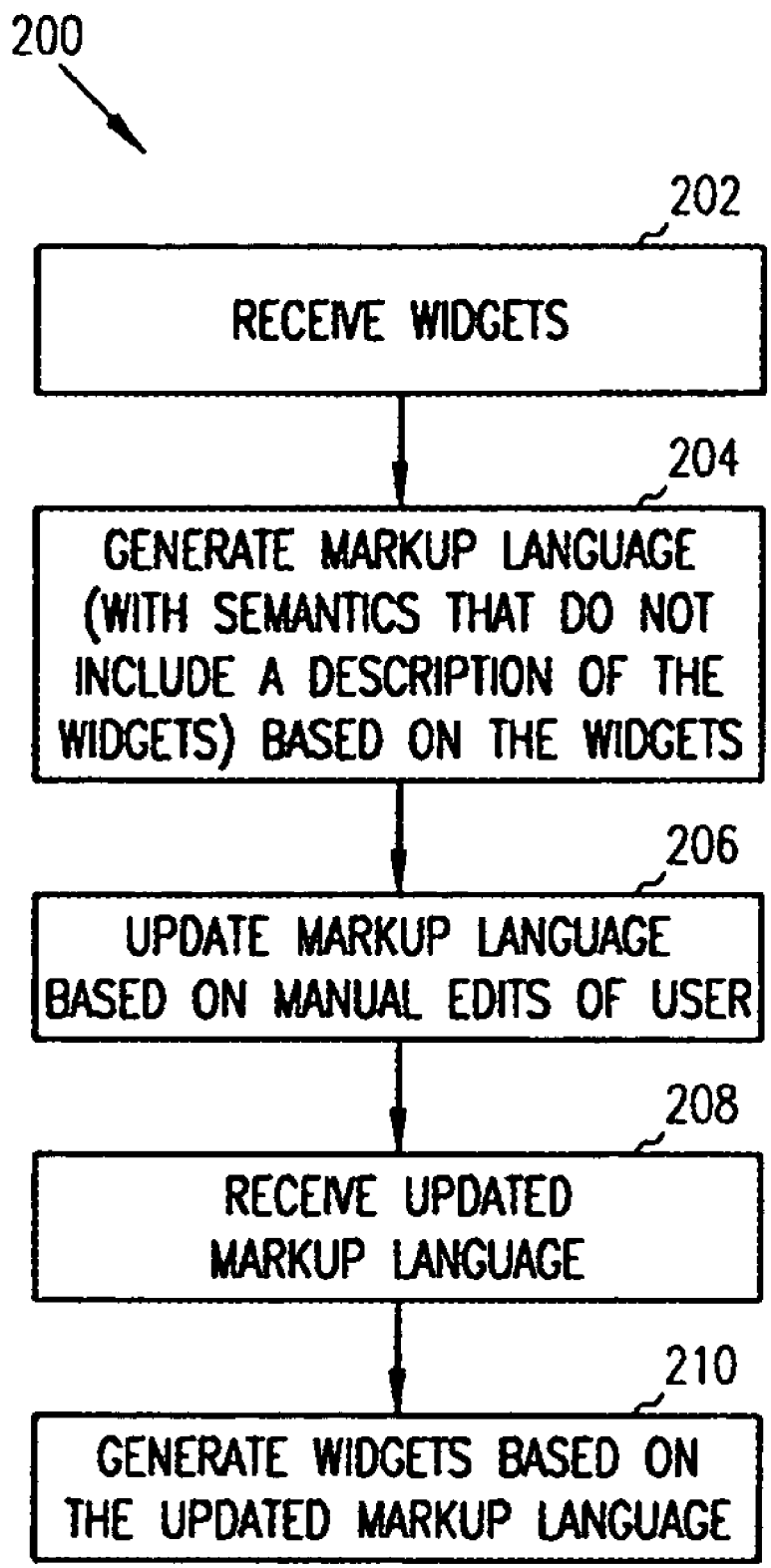
FIG. 2 illustrates a flow diagram of the reversible operations for the generation of markup language based on widgets and vice versa, according to some embodiments of the invention.

FIG. 2 illustrates the generation of markup language based on a number of widgets, which is followed by manually edits of the generated markup language. FIG. 2 then illustrates the generation of widgets based on the edited markup language. However, in some embodiments, the generation of the markup language and the widgets may be mutually exclusive. For example, the markup language (that is used to generate the widgets) may be generated any of a number of different ways. In some embodiments, this markup language is manually created by a user (not just edits thereof). In some embodiments, the markup language may have been generated by other types of applications.

FIG. 2 illustrates a flow diagram of the reversible operations for the generation of markup language based on widgets and vice versa, according to some embodiments of the invention. In particular, FIG. 2 illustrates operations of the reversible translator logic 102, according to some embodiments of the invention. The flow diagram 200 commences at block 202.

Figures 3, 4:
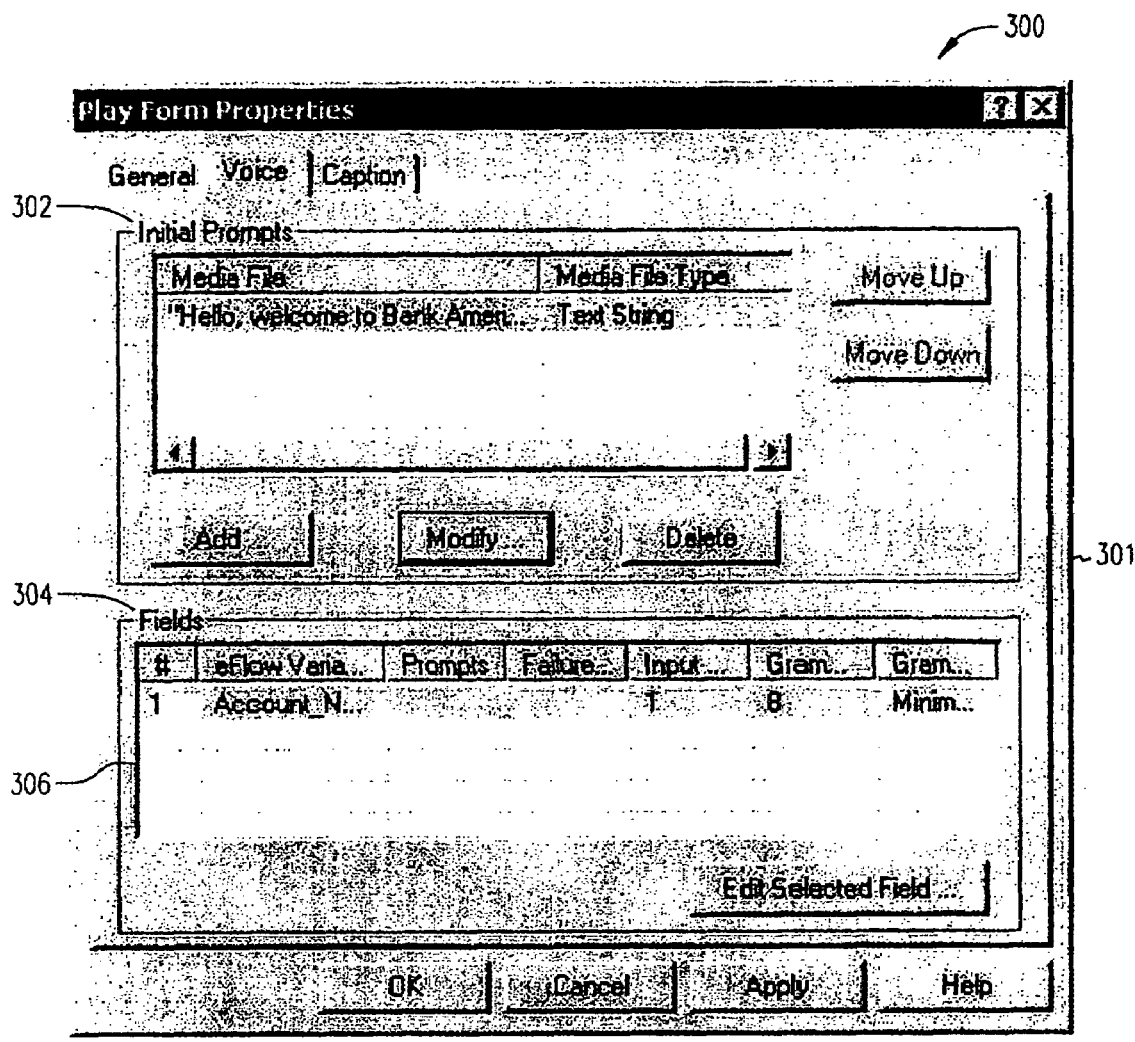
FIG. 3 illustrates a screenshot of a widget, according to some embodiments of the invention.
FIG. 4 illustrates a template associated with a widget, according to some embodiments of the invention.

At block 202, the markup language generation logic 108 receives the widgets 104A. In particular, the markup language generation logic 108 receives the instructions that cause the display of the widgets 104A. The markup language generation logic 108 may also receive the reversible templates 120. FIG. 3 illustrates a screenshot of a widget, according to some embodiments of the invention. The screenshot 300 includes a top-level widget (the "PlayForm" widget) //301. The "PlayForm" widget 301 is associated with a template (which is described in more detail below). The "PlayForm" widget 301 includes an "Initial Prompts" property 302. The "PlayForm" widget 301 includes a "Fields" table 304, which has a single member "Account_Number" 306. The "Fields" table 304 is represented by a recursive sub-widget, which is associated with its own template (which is described in more detail below).

FIG. 4 illustrates a template associated with a widget, according to some embodiments of the invention. In particular, FIG. 4 illustrates a template associated with the "PlayForm" widget 301, according to some embodiments of the invention. A template 400 includes a line 401 that associates this template with the widget "PlayForm". The template 400 includes a body 402. The body 402 includes a line 404 that indicates that the value of the "InitialPrompt" field (as further described below) is inserted into the template at this location. The body 402 also includes a line 406 that is representative of the location where the subwidget is to be inserted (as further described below).

Figure 5:
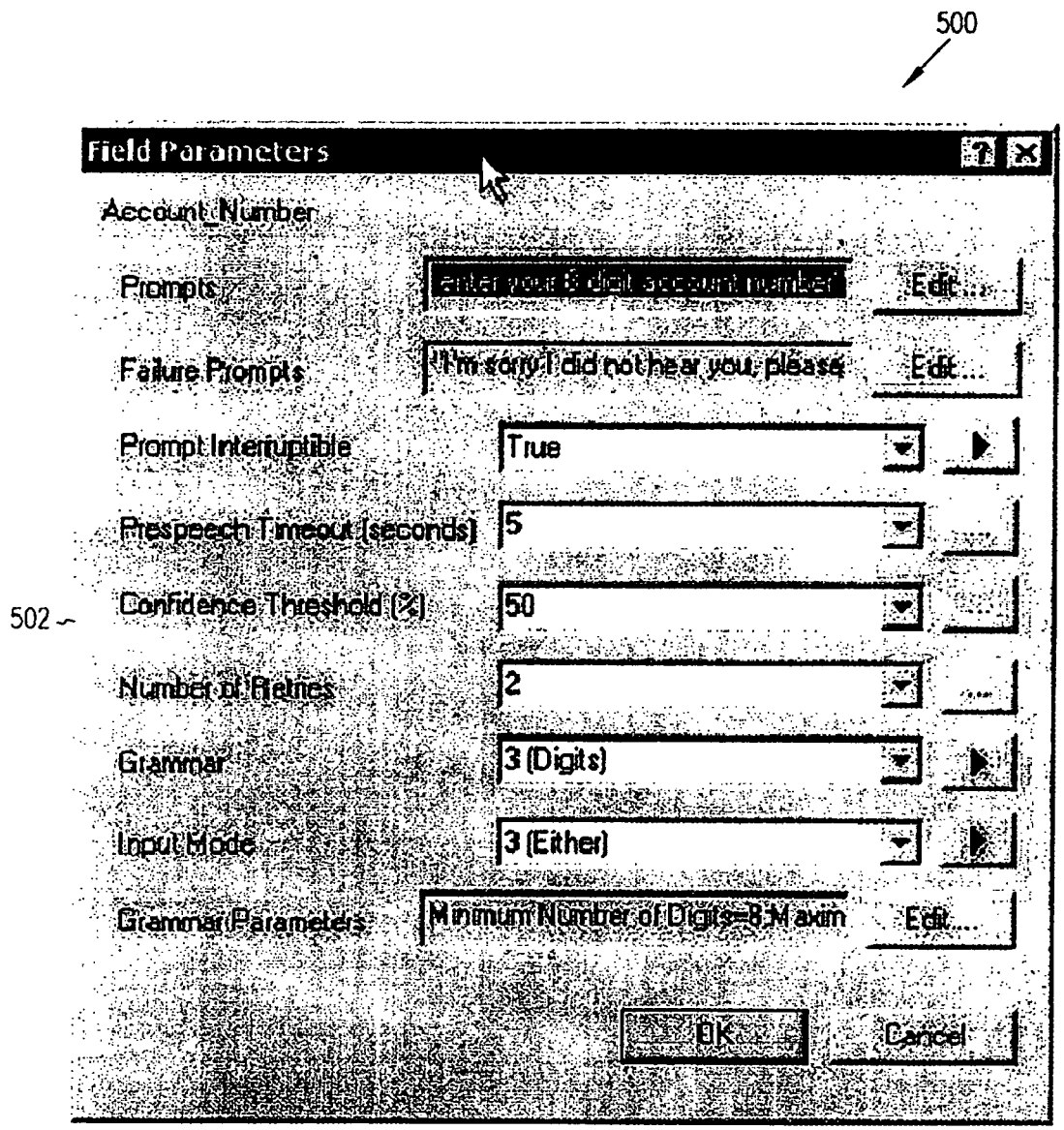
FIG. 5 illustrates a screen shot of a subwidget, according to some embodiments of the invention.

FIG. 5 illustrates a screen shot of a subwidget, according to some embodiments of the invention. In particular, the screenshot 500 includes a widget for the Field (Field widget 502). The Field widget 502 is a widget that is within the PlayForm widget 301. The Field widget 502 includes a number of properties, "Prompts, "Failure Prompts", etc.

FIG. 6 illustrates a template associated with the Field widget, according to some embodiments of the invention. In particular, FIG. 6 illustrates a template associated with the Field widget 502, according to some embodiments of the invention. A template 600 includes a line 602 for the "Path" property that indicates whether this template should be inserted in the parent template (the "PlayForm" widget 301). As shown, the template 600 is to be inserted at line 406 of the template 400. The template 600 also includes a line 604 that is a test for usage of this template. In particular, the test indicates that the template 600 is used only when the value of the "Grammar" parameter is three.

In some embodiments, there may be a number of templates for a given widget. In such situations, a best match may be selected. To illustrate, FIG. 7 illustrates another template for the Field widget, according to some embodiments of the invention. In particular, FIG. 7 illustrates a template 700 that is similar to the template 600. However, the template 700 is not used to generate markup language code because the Test property does not match those properties shown in FIG. 4. In particular, the template 700 includes a line 702 that is a test for the usage of this template. The Test property requires that the "Grammar" parameter is five; the "GrammarParameters.MinimumNumberOfDigits" parameter is zero and the "GrammarParameters.MaximumNumberOfDigits" parameter is zero.

FIG. 8 illustrates a subtemplate that is used in conjunction with one or more templates, according to some embodiments of the invention. In particular, FIG. 8 illustrates a subtemplate that is applicable for the template 600 and the template 700, according to some embodiments of the invention. In particular, FIG. 8 illustrates a subtemplate 800 for the widget related to the "InputMode". The subtemplate 800 includes a line 802 that assigns a value to the variable "property name" and to the variable "value". Returning now to the flow diagram 200 of FIG. 2, after receiving the widgets, control continues at block 204.

At block 204, the markup language generation logic 108 generates markup language 106A based on the widgets 104A. In some embodiments, the semantics of the markup language 106A do not include a description of the widgets 104A (including their attributes, such as size, color, location, etc.). Returning to the examples above to illustrate, FIGS. 9-11 illustrate markup language code generated based on widgets, according to some embodiments of the invention. FIG. 9 illustrates markup language code based on the instantiation of a template for a widget, according to some embodiments of the invention. In particular, FIG. 9 illustrates markup language code based on the instantiation of the template 400 for the PlayForm widget 301, according to some embodiments of the invention. In particular, FIG. 9 illustrates markup language code 900.

FIG. 10 illustrates markup language code that includes the markup language code of FIG. 9 that is modified to include markup language code based on the instantiation of another template, according to some embodiments of the invention. In particular, FIG. 10 illustrates markup language code that includes the markup language code 900 that is modified to include markup language code based on the instantiation of the template 600 for the Field widget 502, according to some embodiments of the invention. In particular, markup language code 1002 is the markup language code generated based on the instantiation of the template 600 for the Field widget 502. Accordingly, markup language code 1000 includes the markup language code 900 wherein the markup language code 1002 has been added.

FIG. 11 illustrates markup language code that includes the markup language code of FIG. 10 that is modified to include markup language code based on the instantiation of a subtemplate, according to some embodiments of the invention. In particular, FIG. 11 illustrates markup language code that includes the markup language code 1000 that is modified to include markup language code based on the instantiation of the subtemplate 800 for the InputMode widget, according to some embodiments of the invention. In particular, markup language code 1100 includes the markup language code 1000 with markup language code 1102 being added therein. The markup language code 1102 is the line 802 that is part of the subtemplate 800. The markup language code 1100 also includes a line 1104 (which is discussed in more detail below). Returning to the flow diagram 200 of FIG. 2, after generating the markup language, control continues at block 206.

At block 206, some type of editor application may update the markup language based on manual edits of a user. For example, a user may input the generated markup language code into a text editor and edit such code using the text editor.

For example, FIG. 12 illustrates the markup language code of FIG. 11 that has been manually edited, according to some embodiments of the invention. In particular, markup language code 1200 is the markup language code 1100 wherein a line 1202 has been modified. The line 1202 is modified such that "type='number'" (instead of "type='digits'"). The markup language code 1200 includes lines 1206 (which are discussed in more detail below). Returning to the flow diagram 200 of FIG. 2, after updates to the markup language, control continues at block 208.

At block 208, the widget generation logic 110 receives the updated markup language. With reference to FIG. 1, the parser logic 116 receives the markup language 106B (which may be representative of the updated markup language). Control continues at block 210.

At block 210, the widget generation logic 110 generates widgets based on the updated markup language. The parser logic 116, the pattern match logic 114 and the widget generator 112 generate widgets based on the updated markup language. A more detailed description of these operations is set forth below.

Figure 13:
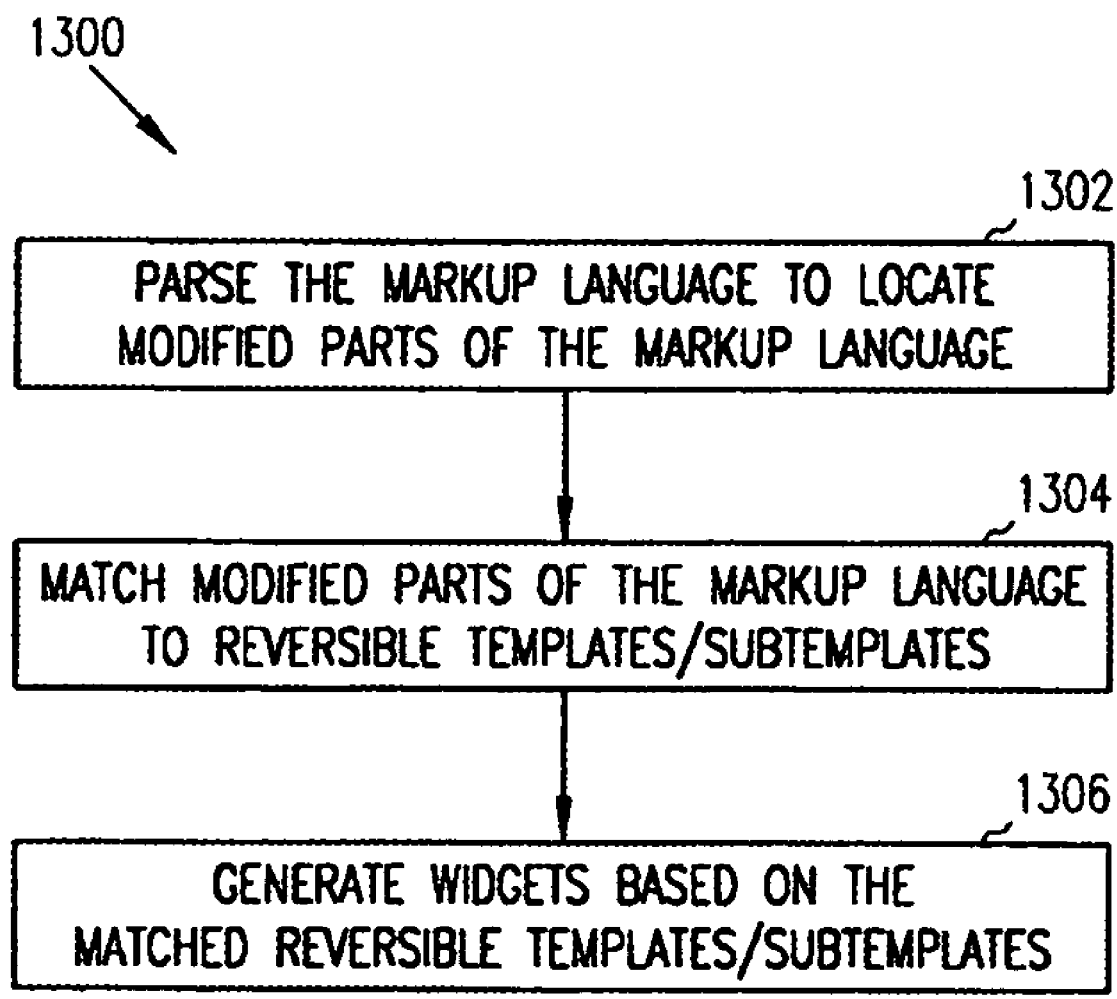
FIG. 13 illustrates a flow diagram of operations for generating widgets based on markup language, according to some embodiments of the invention.

In particular, FIG. 13 illustrates a flow diagram of operations for generating widgets based on markup language, according to some embodiments of the invention. The flow diagram 1300 is described with reference to the system 100 in FIG. 1. The flow diagram 1300 commences at block 1302.

At block 1302, the parser logic 116 parses the markup language 106B to locate modified parts of the markup language. In particular, in some embodiments, the widgets to be generated may have been generated previously. Accordingly, only a part of the markup language may have been modified. Therefore, in some embodiments, the modified parts of the markup language are required to be matched (as further described below). In some embodiments, the widgets may not have been previously generated. In some embodiments, there may not be a previous version of the markup language to compare to locate the modified parts. In some embodiments, the markup language 106B may be without any description of widgets (location, size, color, etc.).

The parser logic 116 may parse to locate the tags. If there is a previous version of the markup language, the parser logic 116 compares the text between the tags for the current version and the previous version to determine if such text has been modified. If there is not a previous version of the markup language, the parser logic 116 may locate the tags and forward the tags and data in between to the pattern match logic 114. The flow continues at block 1304.

At block 1304, the pattern match logic 114 matches the modified parts of the markup language to the reversible templates 120. As further described below, the reversible templates 120 may comprise both templates and subtemplates. In some embodiments, the pattern match logic 114 may match based on a recursive matching operation. The pattern match logic 114 may compare the text between sets of tags to the reversible templates 120 to match (either completely or partially). A more detailed description of this match operation is set forth below in conjunction with the description of FIG. 14. The flow continues at block 1306.

At block 1306, the widget generator 112 generates widgets based on the matched templates. A more detailed description of the generation of widgets is set forth below in conjunction with the description of FIG. 14.

Figure 14:
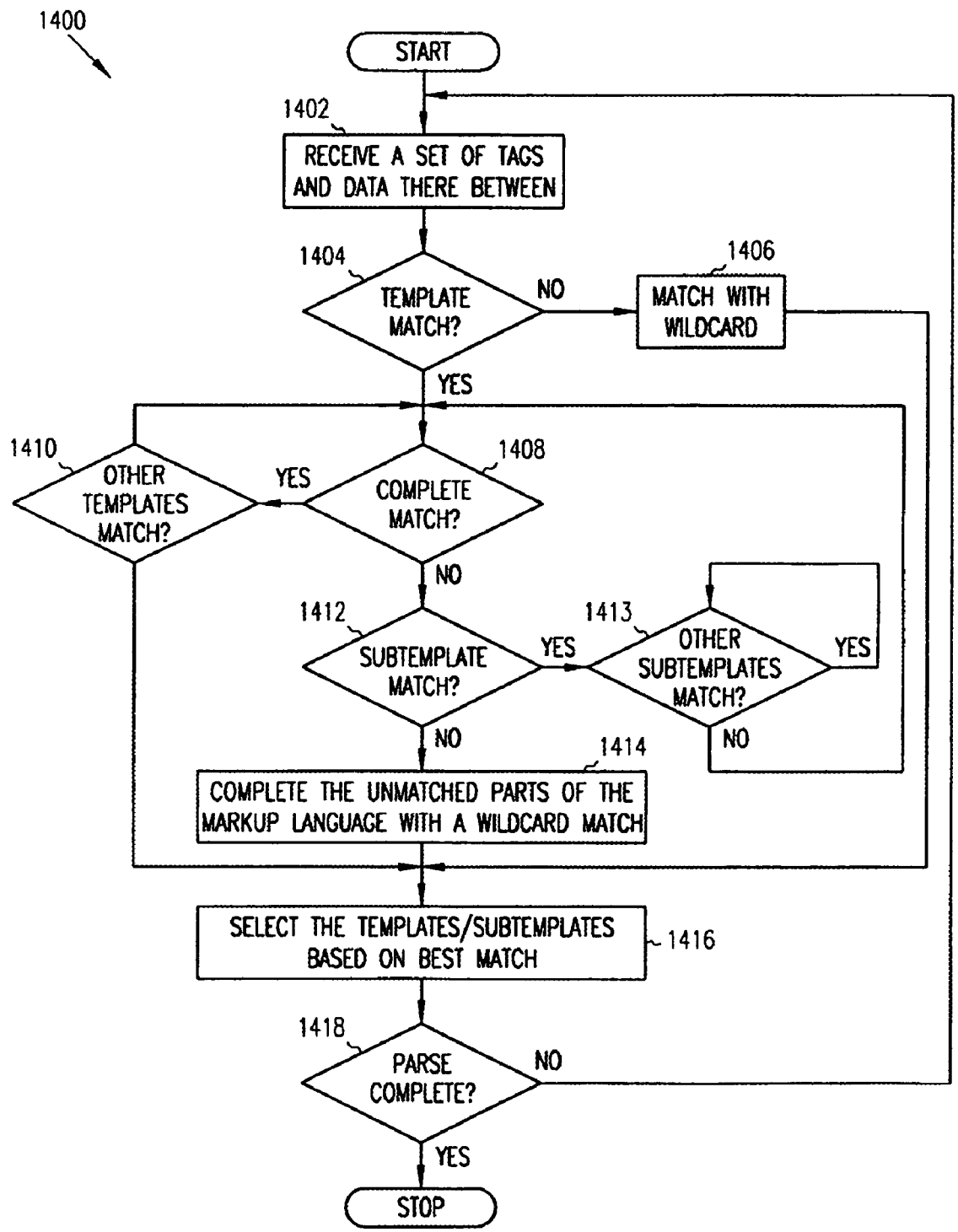
FIG. 14 illustrates a flow diagram of operations for matching markup language to templates for generating of widgets, according to some embodiments of the invention.

FIG. 14 illustrates a flow diagram of operations for matching markup language to templates for generating of widgets, according to some embodiments of the invention. In particular, the flow diagram 1400 provides a more detailed description of the operations at block 1304 of FIG. 13, according to some embodiments. The flow diagram 1400 is described with reference to the system 100 in FIG. 1. The flow diagram 1400 commences at block 1402.

At block 1402, the pattern match logic 114 receives a set of tags and the data there between. The pattern match logic 114 may receive the set of tags and data from the parser logic 116 (as described above). The flow continues at block 1404.

At block 1404, the pattern match logic 114 determines whether the set of tags and the data match one of the templates of the reversible templates 120. Returning to FIGS. 4 and 12 to help illustrate, the template 400 is an approximate match to the markup language code 1200. In other words, the data in the template 400 is within the markup language code 1200. However, the template 400 does not match all of the markup language code 1200. In particular, there is additional data (the lines 1206) that is not in the template 400. Upon determining that there is a template match, the flow continues at block 1408, which is described in more detail below. Upon determining that there is not a template match, the flow continues at block 1406.

At block 1406, the pattern match logic 114 matches the tags and the data there between to a wildcard match. In particular, the pattern match logic 114 is not able to match the tags and data to any of the reversible templates 120. Accordingly, the pattern match logic 114 uses a generic template that matches any set of tags and data. A widget generated from a template includes a number of properties that are defined in the template. In some embodiments, a widget generated from a wildcard template includes a name of "wildcard" and includes an empty property list because there are no properties that may be edited. Moreover, in some embodiments, the pattern match logic 114 marks the location of the markup language that is defined as a wildcard. The pattern match logic 114 may also not allow the widget to change any properties that would lead to the selection of a different template into which the markup language that has been marked as a wildcard would not fit. The flow continues at block 1416, which is described in more detail below.

At block 1408, the pattern match logic 114 determines whether the template match is a complete match. In other words, the pattern match logic 114 determines whether the lines of the tags and data there between are located in the lines of the template and vice versa. With reference to the example above, the template 400 is not a complete match to the markup language code 1200. While the lines of the template 400 are within the markup language code 1200, not all of the lines of the markup language code 1200 are within the template 400. Upon determining that there is not a complete match, the flow continues at block 1410, which is described in more detail below. Upon determining that there is a complete match, the flow continues at block 1410.

At block 1410, the pattern match logic 114 determines whether other templates match the lines of the tags and the data there between. In some embodiments, multiple templates may completely match. Accordingly, the pattern match logic 114 attempts to match another template of the reversible templates 120. Upon determining there are other templates that match, the flow continues at block 1408 where a determination is made of whether there is a complete match (as described above). Upon determining that there are not other templates that match, the flow continues at block 1416, which is described in more detail below.

At block 1412, the pattern match logic 114 determines whether a subtemplate matches the data between the tags that has not been matched to a template. Returning to the example above, the pattern match logic 114 may attempt to match the unmatched parts of the markup language code 1200 (i.e., the lines 1206) to the template 600 of FIG. 6. However, the match fails because the line 1202 does not match to the lines of the template 600. The pattern match logic 114 may also attempt to match the unmatched parts of the markup language code 1200 (i.e., the lines 1206) to the template 700 of FIG. 7. This match is successful. Upon determining that there is not a subtemplate match, the flow continues at block 1414, which is described in more detail below. Upon determining that there is a subtemplate match, the flow continues at block 1413. For example, only a part of the unmatched parts may have matched. Accordingly, the pattern match logic 114 may continue to recursively attempt to match the unmatched parts of the markup language to a template.

At block 1413, the pattern match logic 114 determines whether other subtemplates match the data between the tags that has not been matched to a template. As described above, multiple templates may match. Accordingly, the pattern match logic 114 may check for matches to the other templates in the reversible templates 120. Upon determining that there are other subtemplates that match, the flow continues at block 1413 where this determination is again made. Upon determining that there are not other subtemplate matches, the flow continues at block 1408 where a determination is again made of whether there is a complete match.

At block 1414, the pattern match logic 114 completes the unmatched parts of the markup language with a wildcard match. In particular, if a complete match cannot be made, the pattern match logic 114 may complete the markup language with a wildcard match. Returning to the example above, assume that an edit of the markup language code 1200 is such that there is no complete match. For example, FIG. 15 illustrates the markup language code of FIG. 11 that has been manually edited, according to some embodiments of the invention. In particular, markup language code 1500 is the markup language code 1100 wherein the line 1104 has been removed. Therefore, neither the template 600 nor the template 700 is a complete match to the unmatched parts of the markup language code 1500. Accordingly, the pattern match logic 114 is able to match the template 400 of FIG. 4 to a part of the markup language code 1500. However, because there is no matching template for the unmatched parts, the pattern match logic 114 may insert a wildcard template so that the resulting widget will include a blank face with no properties that may be edited. Such a widget records that it matches/generates the whole string from '<field>' to '</field>'. Returning to the flow diagram 1400, the flow continues at block 1416.

At block 1416, the pattern match logic 114 selects the templates/subtemplates based on a best match. As described above, multiple templates may partially or completely match the markup language. Accordingly, the pattern match logic 114 may assign a match value. The match value may be based on the number of wildcard matches. Therefore, the less that a wildcard match is used in the generation of a template, the better the match. For example, a template may include four different subtemplates. A first set of templates/subtemplates may include the use of three different wildcard templates. A second set of templates/subtemplates may include the use of one wildcard template. Accordingly, the second set is a better match. The match value may be based on other criteria. For example, the match value may be based on the number of widgets needed. In particular, the use of less widgets is considered a better match. The flow continues at block 1418.

At block 1418, the pattern match logic 114 determines whether the parsing of the markup language is complete. The pattern match logic 114 may make this determination based on whether there are additional tags and associated data to be processed by the parser logic 116. Upon determining that the parsing is not complete, the flow continues at block 1402 where another set of tags and the data there between is received. Upon determining that the parsing is complete, the operation of the flow diagram 1400 is complete.

Figure 16:
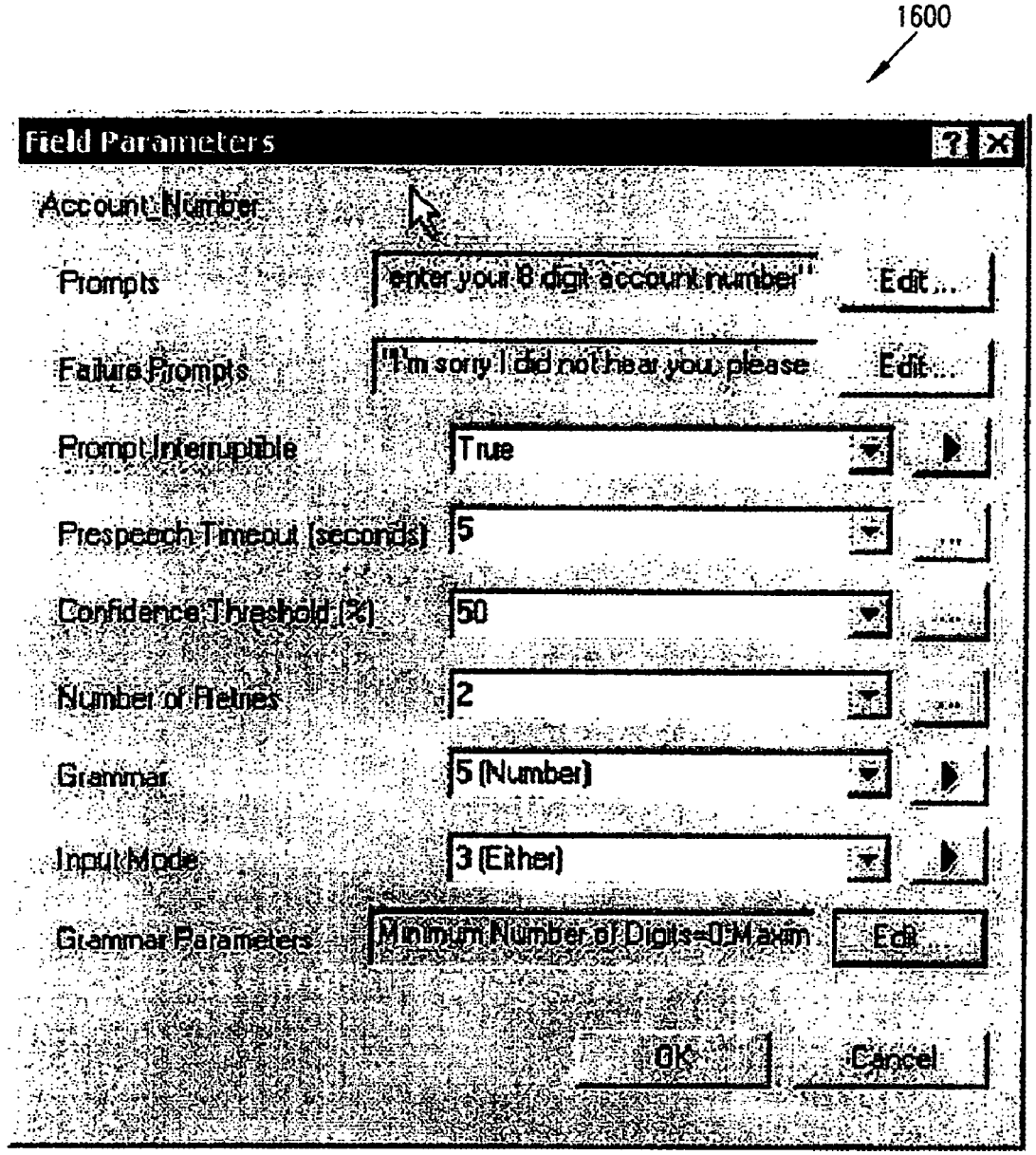
FIG. 16 illustrates a screenshot of updated Field widget, according to some embodiments of the invention.

As described above in FIG. 13, after the pattern matching operation, the widget generator 112 may generate the widgets based on the matched/wildcard templates (see block 1306). With reference to the markup language code 1200, the widget generator 112 may generate two different widgets. The first widget is the same as the PlayForm widget 301 of FIG. 3 because the template 400 has not been modified. However, some of the properties for the Field widget 502 have been modified. In particular, the "Grammar" and "GrammarProperties" properties have been modified. Based on the Field widget 502, the "Grammar" property equals "5", and the "GrammarProperties" property is "GrammarParameters.MinimumNumberOfDigits==0 && GrammarParameters.MaximunNumberOfDigits==0". Accordingly, FIG. 16 illustrates a screenshot of updated Field widget, according to some embodiments of the invention. The screenshot 1600 illustrates the updated values for the "Grammar" and "GrammarProperties" properties in comparison to the screenshot 500 of FIG. 5.

Accordingly, as described, some embodiments allow a user to generate a number of widgets, wherein markup language may be generated therefrom. Subsequently, the user may manually edit this generated markup language. Some embodiments allow for the regeneration of the number of widgets that may include the manually edits made by the user.

Exemplary Hardware Environment

Figure 17:
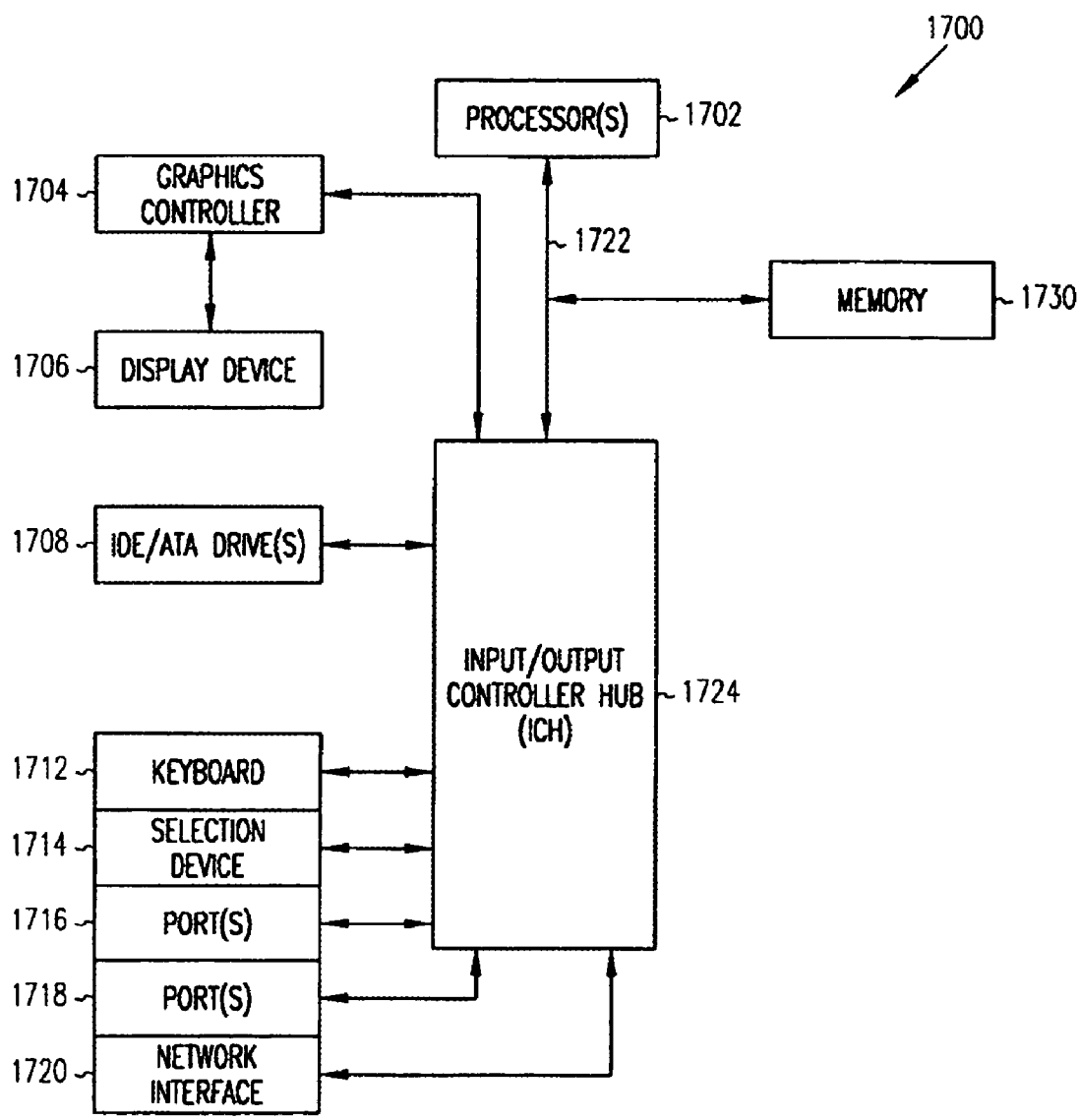
FIG. 17 illustrates a computer device that executes software for performing operations related to reversible logic for widget and markup language generation, according to some embodiments of the invention.

An embodiment wherein software performs operations related to reversible logic for widget and markup language generation as described herein is now described. In particular, FIG. 17 illustrates a computer device that executes software for performing operations related to reversible logic for widget and markup language generation, according to some embodiments of the invention. FIG. 17 illustrates a computer device 1700 that may be representative of at least part of the configuration of the client servers 106A-106N, the cache servers 104A-104N and/or the user devices 102A-102N.

As illustrated in FIG. 17, a computer device 1700 comprises processor(s) 1702. The computer device 1700 also includes a memory 1730, a processor bus 1722, and an input/output controller hub (ICH) 1724. The processor(s) 1702, the memory 1730, and the ICH 1742 are coupled to the processor bus 1722. The processor(s) 1702 may comprise any suitable processor architecture. The computer device 1700 may comprise one, two, three, or more processors, any of which may execute a set of instructions in accordance with some embodiments of the invention.

The memory 1730 stores data and/or instructions, and may comprise any suitable memory, such as a random access memory (RAM). For example, the memory 1730 may be a Static RAM (SRAM), a Synchronous Dynamic RAM (SDRAM), DRAM, a double data rate (DDR) Synchronous Dynamic RAM (SDRAM), etc. A graphics controller 1704 controls the display of information on a display device 1706, according to an embodiment of the invention.

The ICH 1724 provides an interface to Input/Output (I/O) devices or peripheral components for the computer device 1700. The ICH 1724 may comprise any suitable interface controller to provide for any suitable communication link to the processor(s) 1702, the memory 1730 and/or to any suitable device or component in communication with the ICH 1724. For an embodiment of the invention, the ICH 1724 provides suitable arbitration and buffering for each interface.

In some embodiments, the ICH 1724 provides an interface to one or more suitable Integrated Drive Electronics (IDE)/Advanced Technology Attachment (ATA) drive(s) 1708, such as a hard disk drive (HDD). In an embodiment, the ICH 1724 also provides an interface to a keyboard 1712, a mouse 1714, one or more suitable devices through ports 1716-1718 (such as parallel ports, serial ports, Universal Serial Bus (USB), Firewire ports, etc.). In some embodiments, the ICH 1724 also provides a network interface 1720 though which the computer device 1700 may communicate with other computers and/or devices.

With reference to the system 100, the memory 1730 and/or one of the IDE/ATA drives 1708 may store the widgets 104A-104B, the markup language 106A-106B and/or the reversible templates 120. In some embodiments, the markup language generation logic 108, the widget generation logic 110, the widget generator 112, the pattern match logic 114 and the parser logic 116 may be instructions executing within the processor(s) 1702. Therefore, the markup language generation logic 108, the widget generation logic 110, the widget generator 112, the pattern match logic 114 and the parser logic 116 may be stored in a machine-readable medium that are a set of instructions (e.g., software) embodying any one, or all, of the methodologies described herein. For example, the markup language generation logic 108, the widget generation logic 110, the widget generator 112, the pattern match logic 114 and the parser logic 116 may reside, completely or at least partially, within the memory 1730, the processor(s) 1702, one of the IDE/ATA drive(s) 1708, etc.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for reversible logic for widget and markup language generation, in accordance with some embodiments of the invention. A number of flow diagrams illustrate the operations for reversible logic for widget and markup language generation, in accordance with some embodiments of the invention. The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method including:
   receiving a number of widgets, wherein the number of widgets is associated with a number of reversible templates;
   generating descriptor language representative of at least one of the number of widgets using at least one of the number of reversible templates, wherein the descriptor language is independent of attributes of the number of widgets;
   updating the descriptor language based on edits to create updated description language;

matching, at least partially, modified parts of the updated descriptor language to at least part of the number of reversible templates and matching any unmatched parts of the updated mark-up with at least one wildcard template, the wildcard template comprising a generic template that matches any tags and data;

selecting a set of matched reversible templates and matched wildcard templates based upon a best match; and generating updated widgets based on the selected best matched set of reversible templates and matched wildcard templates.

2. The method of claim 1, wherein generating the updated widgets includes generating the updated widgets based on a combination of one or more reversible templates including at least one subtemplate, and at least one wildcard template having an empty property list.

3. The method of claim 1, wherein receiving the number of widgets includes receiving the number of widgets generated by a Graphical User Interface application.

4. The method of claim 1, further including parsing the descriptor language to locate sets of tags, wherein the matching is based on matching of the sets of tags and the data between the sets of tags to the number of reversible templates.

5. A system including:
a machine-readable medium to store a number of widgets, a number of reversible templates and mark-up language;

mark-up language generation logic to generate mark-up language for the number of widgets based on the number of reversible templates associated with the number of widgets, wherein the semantics of the mark-up language do not include a description of the number of widgets;

parser logic to receive an edited version of the mark-up language and to parse the edited mark-up language to locate a modified parts of the mark-up language including at least one set of tags associated with modified data within the edited version;

pattern match logic to select reversible templates by matching the set of tags and the modified data between the set of tags to at least one reversible template and at least one reversible subtemplate of the number of reversible templates, and to match any unmatched portions of the edited mark-up language with one or more wildcard templates forming a best match, the wildcard templates being a generic template that match any tags and data; and a widget generator to generate one or more widgets based on the best match of reversible templates, subtemplates and wildcard templates.

6. The system of claim 5, wherein the widget generator generates the one or more updated widgets based on a combination of reversible templates including at least one subtemplate, and at least one wildcard template having an empty property list.

7. The system of claim 5, wherein the best match is based upon a minimum member of wildcard matches.

* * * * *

UNITED STATES PATENT AND TRADEMARK OFFICE
CERTIFICATE OF CORRECTION

| | | |
|---|---|---|
| PATENT NO. | : 7,634,722 B2 | Page 1 of 1 |
| APPLICATION NO. | : 11/075793 | |
| DATED | : December 15, 2009 | |
| INVENTOR(S) | : James Barnett | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 787 days.

Signed and Sealed this

Ninth Day of November, 2010

David J. Kappos
*Director of the United States Patent and Trademark Office*